Jan. 18, 1949.   B. E. SEWARD   2,459,245
TRACTOR HITCH PIN DEVICE
Filed Nov. 1, 1946
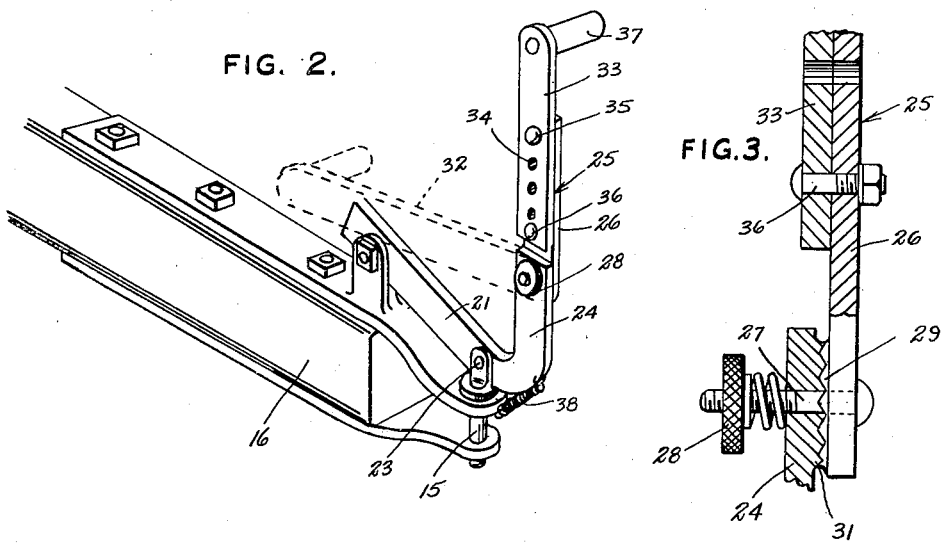
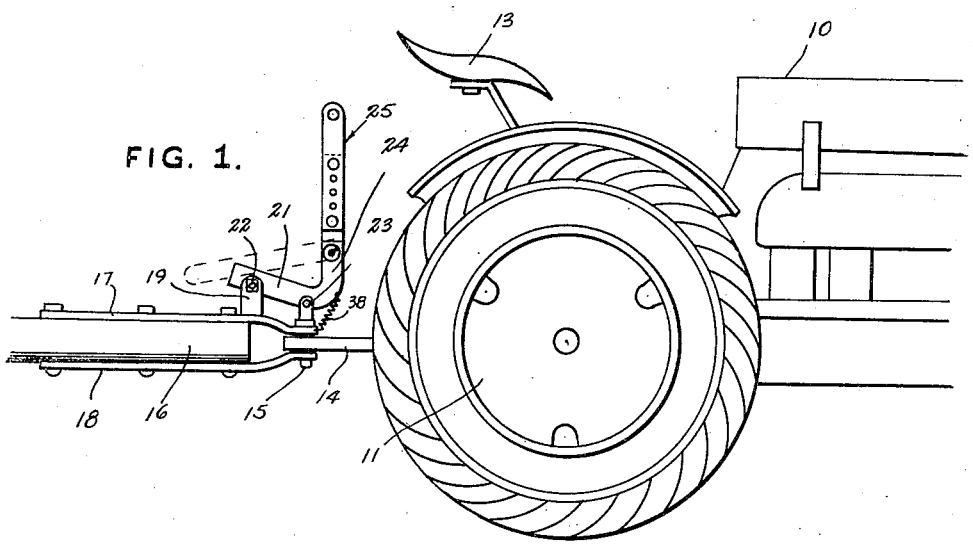
INVENTOR:
BASIL E. SEWARD,
McMorrow, Berman & Davidson
ATTORNEY.

Patented Jan. 18, 1949

2,459,245

UNITED STATES PATENT OFFICE 2,459,245

TRACTOR HITCH PIN DEVICE

Basil E. Seward, Elk Point, S. Dak.

Application November 1, 1946, Serial No. 707,213

2 Claims. (Cl. 280—33.15)

This invention relates to tractor hitches and more particularly to a device for effecting the withdrawal and insertion of the hitch pin.

It is an object of the present invention to provide a hitch device for connecting trail behind implements to a tractor wherein the pin can be withdrawn or inserted from a point upon the tractor without the necessity of getting off the tractor, and whereby this means has sufficient leverage so that it can be effected with a minimum of effort and without requiring that devices be provided to strike the hitch pin so as to place a burr thereon and make it difficult to be used thereafter.

It is another object of the present invention to provide a device for operating the hitch pin of a tractor implement which while being readily accessible can be broken down so that its parts will not interfere with the operation of the implement or be in the way of the operator of the tractor and further whereby an adjustment can be made of the arm which normally extends upwardly so as to suit the particular operator of the tractor.

For other objects of the invention and for a better understanding of the same, reference may be had to the following detailed description taken in connection with the accompanying drawing, in which:

Figure 1 is a side elevational view of a portion of a tractor having a drawbar and with the implement tongue connected to the same by a hitch pin operated by a device embodying the features of the present invention.

Figure 2 is an enlarged perspective view of the implement tongue removed from the tractor drawbar and showing the operating device for the hitch pin mounted thereon.

Figure 3 is a cross sectional view taken through portions of the handle structure of the hitch pin operating device.

Referring now to the figures, 10 represents a tractor having a rear wheel structure 11 with an operator's station or seat 13 located thereon. From the rear of the tractor there extends a tractor drawbar 14 having holes therein adapted to receive a hitch pin 15 whereby to connect a tractor drawn implement to the tractor by means of a tongue 16 having vertically spaced side plates 17 and 18 with holes in their forward ends adapted also to receive the hitch pin 15 whereby to make the connection of the tongue with the drawbar 14. The forward ends of the vertically spaced plates 17 and 18 are pinched together so as to permit the use on a short hitch pin 15.

The top piece 17 has an upwardly extending lug 19 to which is pivoted a member 21 by means of a bolt pivot pin extending through the member 21 and the lug 19. This bolt pivot pin is indicated at 22. The forward end of the member 21 is connected by a rivet 23 to the top of the hitch pin 15. The forward end of the member is also curved upwardly to provide a vertically extending portion 24.

To this vertically extending portion 24 there is connected an adjustable arm structure indicated generally at 25. This arm structure 25 includes a member 26 connected to the upper end of the vertical portion 24 by means of a bolt 27 and a knurled nut 28. The member 26 has serrated portions 29 thereon cooperating with complementary serrated portions 31 on the vertical portion 24. A spring is disposed between the knurled nut 28 at the side face of the portion 24 whereby to permit the pivotal adjustment of the member 26 on the portion 24 at any time it is desired to swing the handle structure 25 rearwardly to an out-of-the-way position as indicated in dotted lines 32 of Figure 2.

In order that the handle structure 25 can be adjusted to different lengths, there is provided a second member 22 having a series of holes 34 extending along the length of the same and adapted to have bolt means 35 and 36 extended through them so as to retain the member 33 in an adjusted position upon the member 26. Similar holes can be provided upon the member 26. The member 33 has a hand engaging portion 37. When the handle structure 25 is in the raised position it can be seen that it is readily accessible to the operator upon the operator's station 13. The structure 25 can be elongated to have different lengths so that the operator who may have short arms can more easily reach the hand engaging portion 37.

At times when it is desired to hitch the implement to the tractor drawbar or to unhitch the same the hand of the operator grasps the hand engaging portion 37 and it is pivoted upwardly about the pivot pin 22 thereby withdrawing the hitch pin 15 from its engagement with the pieces 17 and 18 and the drawbar 14. A spring 38 connected between the forward end of the member 21 and to the forward end of the piece 17 will tend to hold the pivoted structure downwardly as when the hitch pin 15 is in place.

Having now described my invention, I claim:

1. A hitch device for connecting an implement to the drawbar of a vehicle comprising, a horizontally-extending tongue member, upper and lower plate members secured to the upper and lower sides of said tongue member having vertically-spaced extensions on their forward ends which are apertured to receive a vertically-extending and upwardly-movable hitch-pin, a lug extending upwardly from the upper plate member, an L-shaped lever member having the free end part of its lower horizontal portion pivoted to said lug and its vertical portion provided with an aperture through its upper end part, means intermediate the opposite ends of said lever member for pivotally connecting said lever member to a hitch pin, an auxiliary arm member having its lower end portion pivotally secured to said vertical portion of said lever member, an extension secured to the upper part of said auxiliary member, a handle on the upper end of said extension for facilitating manual swinging of said auxiliary arm member and extension between a vertical position substantially coplanar with said vertical portion of said lever member and a relatively horizontal position, the adjacent faces of said vertical portion of said lever member and said extension being formed to have complementary serrations, and spring means normally urging said serrated faces into engaging relation.

2. A hitch device for connecting an implement to the drawbar of a vehicle comprising, a horizontally-extending tongue member, upper and lower plate members secured to the upper and lower sides of said tongue member having vertically-spaced extensions on their forward ends which are apertured to receive a vertically-extending and upwardly-movable hitch-pin, a lug extending upwardly from the upper plate member, an L-shaped lever member having the free end part of its lower horizontal portion pivoted to said lug and its vertical portion provided with an aperture through its upper end part, means intermediate the opposite ends of said lever member for pivotally connecting said lever member to a hitch pin, an auxiliary arm member having its lower end portion pivotally secured to said vertical portion of said lever member, an extension secured to the upper part of said auxiliary member, a handle on the upper end of said extension for facilitating manual swinging of said auxiliary arm member and extension between a vertical position substantially coplanar with said vertical portion of said lever member and a relatively horizontal position, and spring means connected with said upper plate member and said lever member normally urging said lever member downwardly relative to the hitch-pin.

BASIL E. SEWARD.

REFERENCES CITED

The following references are of record in the file of this patent:

UNITED STATES PATENTS

| Number | Name | Date |
|---|---|---|
| 372,979 | Hughey | Nov. 8, 1887 |
| 1,112,214 | Johnson | Sept. 29, 1914 |
| 1,692,071 | Austin et al. | Nov. 20, 1928 |

FOREIGN PATENTS

| Number | Country | Date |
|---|---|---|
| 104,735 | Australia | Aug. 18, 1938 |
| 104,749 | Australia | Aug. 18, 1938 |